(12) United States Patent
Liao et al.

(10) Patent No.: US 11,654,522 B2
(45) Date of Patent: May 23, 2023

(54) METHOD FOR ANALYZING OVERCUTTING DEFECT OF MACHINING PROCESS

(71) Applicant: INDUSTRIAL TECHNOLOGY RESEARCH INSTITUTE, Hsinchu (TW)

(72) Inventors: Chien-Chih Liao, Taichung (TW); Kuo-Hua Chou, Zhubei (TW); Cheng-Wei Wang, Taipei (TW); Jen-Ji Wang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 198 days.

(21) Appl. No.: 17/179,093

(22) Filed: Feb. 18, 2021

(65) Prior Publication Data

US 2022/0212304 A1    Jul. 7, 2022

(30) Foreign Application Priority Data

Jan. 6, 2021    (TW) ................................ 110100457

(51) Int. Cl.
*B23Q 15/24*    (2006.01)
*B23Q 17/22*    (2006.01)
(Continued)

(52) U.S. Cl.
CPC .............. *B23Q 15/24* (2013.01); *B23Q 17/20* (2013.01); *B23Q 17/2266* (2013.01);
(Continued)

(58) Field of Classification Search
CPC ..... B23Q 15/24; B23Q 17/2266; G05B 19/41
See application file for complete search history.

(56) References Cited

U.S. PATENT DOCUMENTS

| 4,445,182 | A | * | 4/1984 | Morita | G05B 19/40932 |
| | | | | | 700/181 |
| 5,289,383 | A | * | 2/1994 | Sawamura | G05B 19/41 |
| | | | | | 700/187 |

(Continued)

FOREIGN PATENT DOCUMENTS

| CN | 103616849 A | 3/2014 |
| CN | 104334303 B | 10/2016 |

(Continued)

OTHER PUBLICATIONS

TW Decision to Grant dated Aug. 9, 2021 as received in Application No. 110100457.
Taiwan Patent Application No. 109100301 filed Jan. 6, 2020.

*Primary Examiner* — Michael W Hotchkiss
(74) *Attorney, Agent, or Firm* — Maschoff Brennan

(57) ABSTRACT

A method for analyzing an overcutting defect of a machining process comprises steps as following. A machining code is executed to generate a cutting face, wherein the cutting face comprises a plurality of machining paths. A specified machining path is defined from the plurality of machining paths and a specified node is set on the specified machining path. A sectional plane passing through the specified node is calculated. A plurality of intersection points between the sectional plane and the other machining paths which are different from the specified machining path are obtained. A first adjacent intersection point a second adjacent intersection point are specified from the intersection points. A connection line located between the first adjacent intersection point and the second adjacent intersection point is obtained. A distance between the specified node and connection line is calculate and the distance is defined as an overcutting amount of the specified node.

8 Claims, 8 Drawing Sheets

(51) Int. Cl.
  *B23Q 17/20* (2006.01)
  *G05B 19/41* (2006.01)
  *G05B 19/402* (2006.01)

(52) U.S. Cl.
  CPC ........ *B23Q 2717/00* (2013.01); *G05B 19/402* (2013.01); *G05B 19/41* (2013.01); *G05B 2219/37506* (2013.01)

(56) References Cited

U.S. PATENT DOCUMENTS

| | | | | |
|---|---|---|---|---|
| 5,406,494 A * | 4/1995 | Schuett | ................... | G05B 19/41 318/569 |
| 5,710,709 A | 1/1998 | Oliver | | |
| 6,512,961 B1 | 1/2003 | Fukaya | | |
| 7,450,127 B2 * | 11/2008 | Hong | ................. | G05B 19/4103 345/619 |
| 8,560,112 B2 * | 10/2013 | Aizawa | .............. | G05B 19/4103 700/186 |
| 9,104,192 B2 * | 8/2015 | Brand | ................ | G05B 19/4103 |
| 9,524,583 B2 | 12/2016 | Montana | | |
| 9,632,497 B2 * | 4/2017 | Abe | .................... | G05B 19/4097 |
| 9,785,137 B2 * | 10/2017 | Chu | ...................... | G05B 19/182 |
| 9,829,879 B2 * | 11/2017 | Tanuma | ............. | G05B 19/402 |
| 10,133,260 B2 * | 11/2018 | Chen | ...................... | G06F 17/16 |
| 10,252,361 B2 * | 4/2019 | Kikuchi | ................. | B23F 21/10 |
| 10,599,126 B2 * | 3/2020 | Kaneko | ................ | G05B 19/402 |
| 2008/0215174 A1 * | 9/2008 | Kanai | ..................... | G06F 30/00 700/98 |
| 2012/0215334 A1 * | 8/2012 | Tanuma | ............. | G05B 19/4099 700/97 |
| 2013/0204426 A1 * | 8/2013 | Tanuma | ............. | G05B 19/4103 700/190 |
| 2014/0005804 A1 * | 1/2014 | Brand | .................... | G05B 19/31 700/63 |
| 2018/0299859 A1 * | 10/2018 | Kaneko | ................ | G05B 19/402 |
| 2021/0109502 A1 * | 4/2021 | Yasukochi | .......... | G05B 19/4061 |

FOREIGN PATENT DOCUMENTS

| | | |
|---|---|---|
| CN | 107247444 | 10/2017 |
| CN | 106774151 B | 12/2018 |
| CN | 108363357 B | 4/2020 |
| CN | 108536093 B | 4/2020 |
| TW | 200925812 | 6/2009 |
| TW | I414376 | 11/2013 |
| TW | 201417926 A | 5/2014 |
| TW | 201544219 A | 12/2015 |
| TW | I510874 | 12/2015 |
| TW | 201913251 A | 4/2019 |
| WO | 2017/110236 A1 | 6/2017 |

* cited by examiner

METHOD FOR ANALYZING OVERCUTTING DEFECT OF MACHINING PROCESS

CROSS-REFERENCE TO RELATED APPLICATIONS

This non-provisional application claims priority under 35 U.S.C. § 119(a) on Patent Application No(s). 110100457 filed in Republic of China on Jan. 6, 2021, the entire contents of which are hereby incorporated by reference.

BACKGROUND

1. Technical Field

This disclosure relates to a method for analyzing a defect of a machining process, especially for analyzing an overcutting defect of the machining process.

2. Related Art

Generally, a computer-aided design software (CAD) and a computer-aided manufacturing software (CAM) are used to generate a machining path of an object, CAD and CAM have two inherent defects. Regarding the first defect, when a design pattern drawn by the CAD is poor and the poor design pattern is imported into the CAM and converted into a machining code, some broken surfaces easily appear on the cutting surface corresponding to the machining code. These broken surfaces can often be found from the abnormal lines on the surface of a finished product.

Regarding the second defect, when CAM converts the design pattern into the machining code, it is easy to cause the cutting depth of the single node of the machining path on the cutting surface (that is, the overcutting amount of the single node) to be too large due to a calculation error of the CAM. In this case, the overcut of the single node will not only affect the quality of the finished product, but the overcutting amount of the node is often in the micron level, which is very difficult to observe with the naked eye. Due to the above two inherent defects of CAD and CAM, technicians must constantly change the machining path of the product, which wastes a lot of times.

SUMMARY

Accordingly, this disclosure provides a method for analyzing an overcutting defect of a machining process, the overcutting defect of the machining process can be detected without an actual location information feedback from a machine tool controller.

According to one or more embodiment of this disclosure, a method for analyzing an overcutting defect of a machining process, adapted to be executed by a machining path planning device, and the method comprising: executing a machining code to generate a cutting face, wherein the cutting face comprises a plurality of machining paths; selecting one of the plurality of machining paths as a specified machining path and setting a specified node on the specified machining path; calculating a path vector and a tangent vector passing through the specified node according to the specified machining path and the specified node; calculating a sectional plane passing through the specified node according to the path vector, the tangent vector, and the specified node, wherein the path vector is a normal vector of the sectional plane, and the tangent vector and the sectional plane are not coplanar; obtaining a plurality of intersection points between the sectional plane and the other machining paths which are different from the specified machining path; designating two of the intersection points as a first adjacent intersection point a second adjacent intersection point; obtaining a connection line located between the first adjacent intersection point and the second adjacent intersection point; and calculating a distance between the specified node and connection line and defining the distance as an overcutting amount of the specified node.

According to one or more embodiment of this disclosure, another method for analyzing an overcutting defect of a machining process, adapted to be executed by a machining path planning device, and the method comprising: executing a machining code to generate a cutting face, wherein the cutting face comprises a plurality of machining paths; setting a plurality of specified nodes on each of the machining paths according to a fixed interval, wherein each of the machining paths with the specified nodes is defined as a specified machining path; and calculating an overcutting amount of each of the specified nodes, wherein calculating the overcutting amount of each of the specified nodes comprises: calculating a path vector and a tangent vector passing through the specified node according to the specified machining path and the specified node; calculating a sectional plane passing through the specified node according to the path vector, the tangent vector, and the specified node, wherein the path vector is a normal vector of the sectional plane, and the tangent vector and the sectional plane are not coplanar; obtaining a plurality of intersection points between the sectional plane and the other machining paths which are different from the specified machining path; designating two of the intersection points as a first adjacent intersection point a second adjacent intersection point; obtaining a connection line located between the first adjacent intersection point and the second adjacent intersection point; and calculating a distance between the specified node and connection line and defining the distance as the overcutting amount of the specified node.

In view of the above description, the overcutting amount of the specified node can be estimated before the machining code is imported into a machine tool. Then a part of the machining code which is related to the specified node can be corrected according to an estimated overcutting amount to eliminate the overcutting defect of the specified node. In other words, the method of this disclosure can detect the overcutting amount of the specified node without an actual location information feedback from the machine tool controller, and directly modify the machining code to achieve a purpose of optimizing the machining path.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

A method for analyzing an overcutting defect of a machining process is executed, for example, by a machining path planning device, wherein the machining path planning device may be a computer, and has a specification and performance of coupling a computer-aided design software (CAD), a computer-aided manufacturing software (CAM) with a machine tool controller. By the method for analyzing the overcutting defect of this disclosure, the overcutting defect of a single node on the machining path can be detected before CAM machining code is imported into the machine tool controller. In other words, the method for analyzing the overcutting defect can detect the overcutting defect of the machining path without an actual location information feedback from the machine tool controller.

Figure 1:
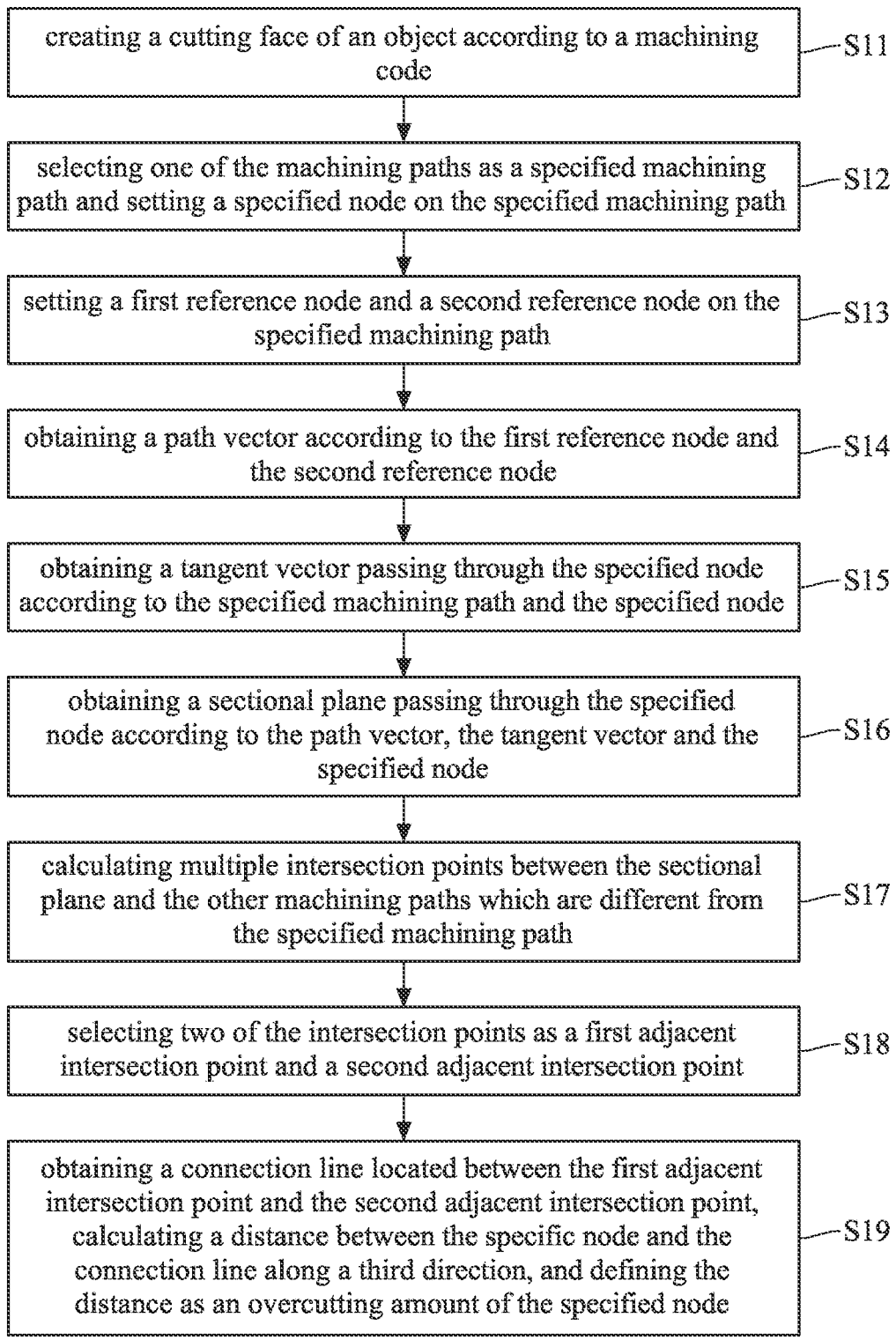
FIG. 1 is a flowchart of a method for analyzing an overcutting defect of a machining process according a first embodiment of this disclosure.
Figure 2:
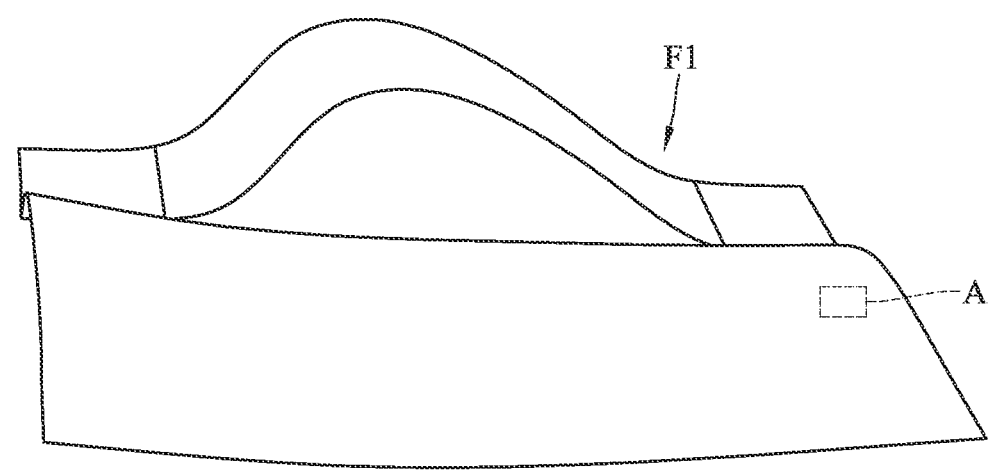
FIG. 2 is a schematic diagram of a cutting face generated by using the method shown in FIG. 1.

FIG. 1 is a flowchart of a method for analyzing an overcutting defect of a machining process according a first embodiment of this disclosure. FIG. 2 is a schematic diagram of a cutting face generated by the method shown in FIG. 1. Refer to FIGS. 1 and 2, the method for analyzing the overcutting defect comprises steps S11 to S19.

Step S11 is creating a cutting face F1 of an object according to a machining code. The machining code comprises several commands used to be imported into a machine tool to drive the machine tool, such as Numerical Control code (NC code) or other commands used to control the operation of the machine tool.

Figure 3:
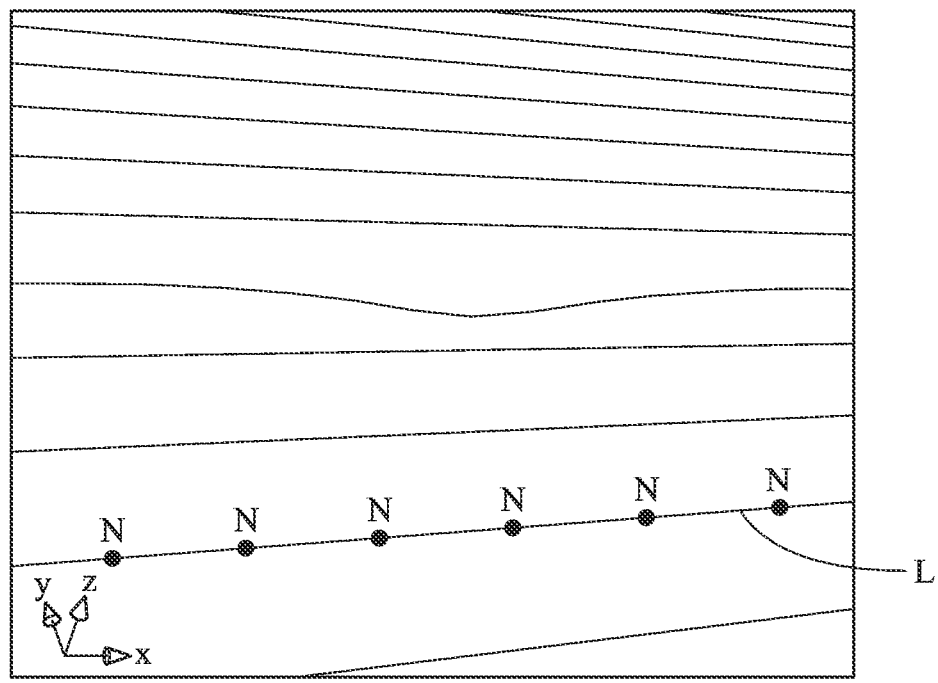
FIG. 3 is a schematic diagram of machining paths included in a part of the cutting face shown in FIG. 2.

FIG. 3 is a schematic diagram of machining paths included in a part of the cutting face shown in FIG. 2. Refer to FIG. 3, the cutting face F1 contains several different machining paths L, and each of the machining paths L is composed of many single nodes N. The path between two adjacent single nodes N is called as a single section, and each of the single nodes N has a three-dimensional coordinate information. After the machining code is imported into the machine tool, a cutlery of the machine tool cuts the object along the machining paths on the cutting face F1 to obtain a desired finished product.

Figure 4:
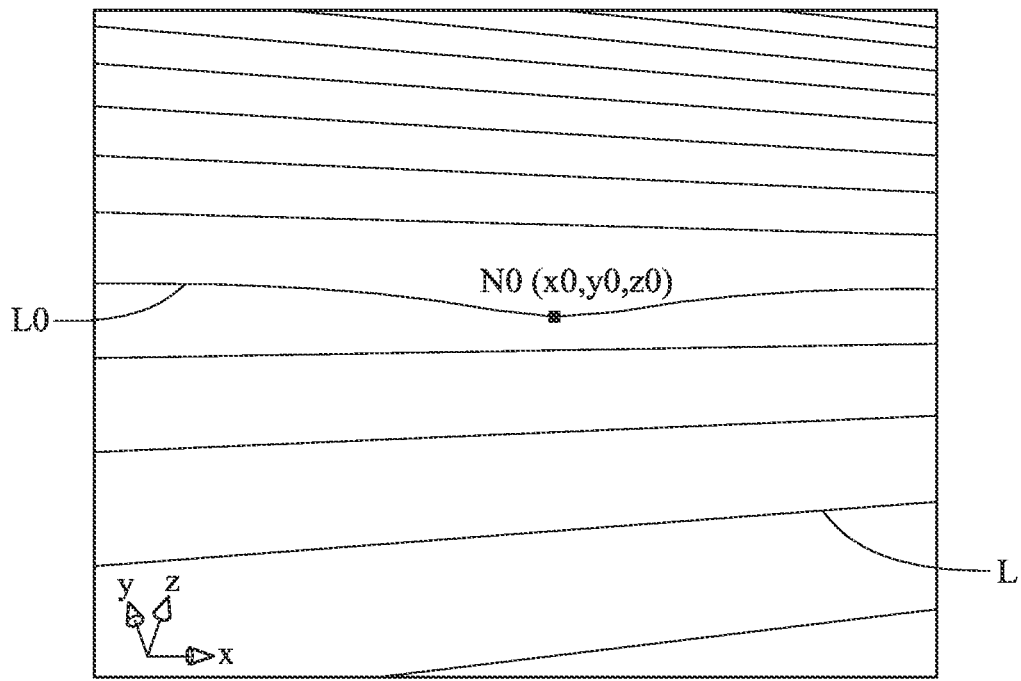
FIG. 4 is a schematic diagram of defining a specified machining path and a specified node on the cutting face shown in FIG. 3.

Please refer to FIGS. 1 and 4, step S12 is selecting one of the machining paths as a specified machining path L0 and setting a specified node N0 on the specified machining path, wherein FIG. 4 is a schematic diagram of selecting the specified path and the specified node according to the cutting face shown in FIG. 3. In FIG. 4, the coordinate of the specified node N0 is $(x_0, y_0, z_0)$.

Figure 5:
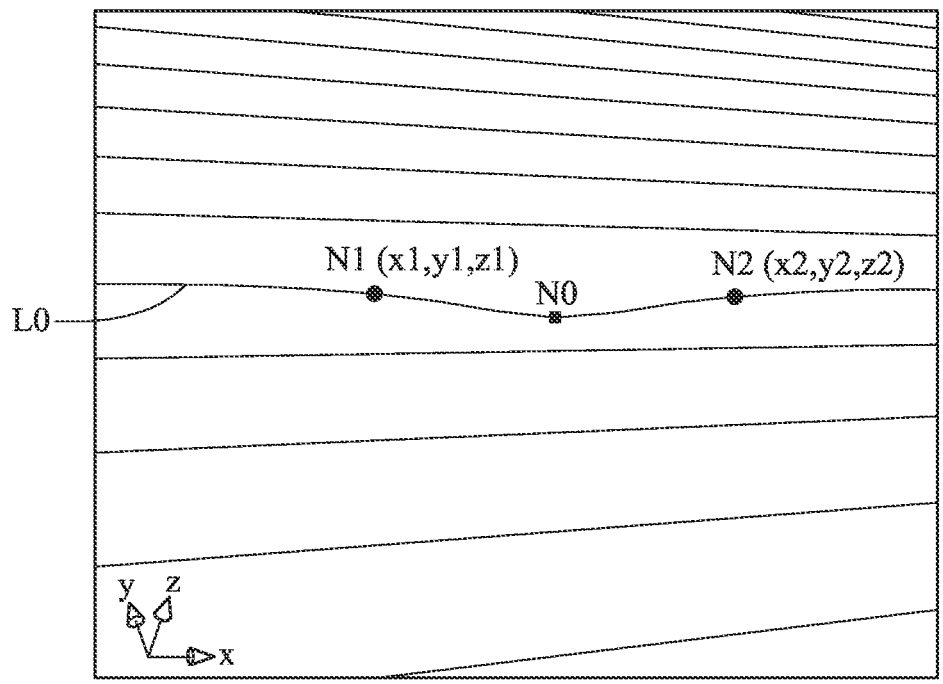
FIG. 5 is a schematic diagram of defining two reference nodes according to the specified machining path and the specified node shown in FIG. 4.

Please refer to FIGS. 1 and 5, step S13 is setting a first reference node N1 and a second reference node N2 on the specified machining path L0, wherein FIG. 5 is a schematic diagram of defining two reference nodes according to the specified machining path and the specified node shown in FIG. 4. In FIG. 5, the coordinate of the first reference node N1 is $(x_1, y_1, z_1)$, and the coordinate of the second reference node is $(x_2, y_2, z_2)$. In this embodiment, the first reference node N1 and the second reference node N2 are respectively located on opposite sides of the specified node N0 along a first direction. For example, the first direction may be X-axis direction, and a distance between the first reference node N1 and the specified node N0 may be different from or the same as a distance between the second reference node N2 and the specified node N0. In other embodiments, the first reference node N1 and the second reference node N2 may be located on the same side of the specified node N0 along the first direction, and a distance between the first reference node N1 and the specified node N0 is different from a distance between the second reference node N2 and the specified node N0. In a preferred embodiment, the first reference node N1 and the second reference node N1 are respectively located on opposite sides of the specified node N0.

Figure 6:
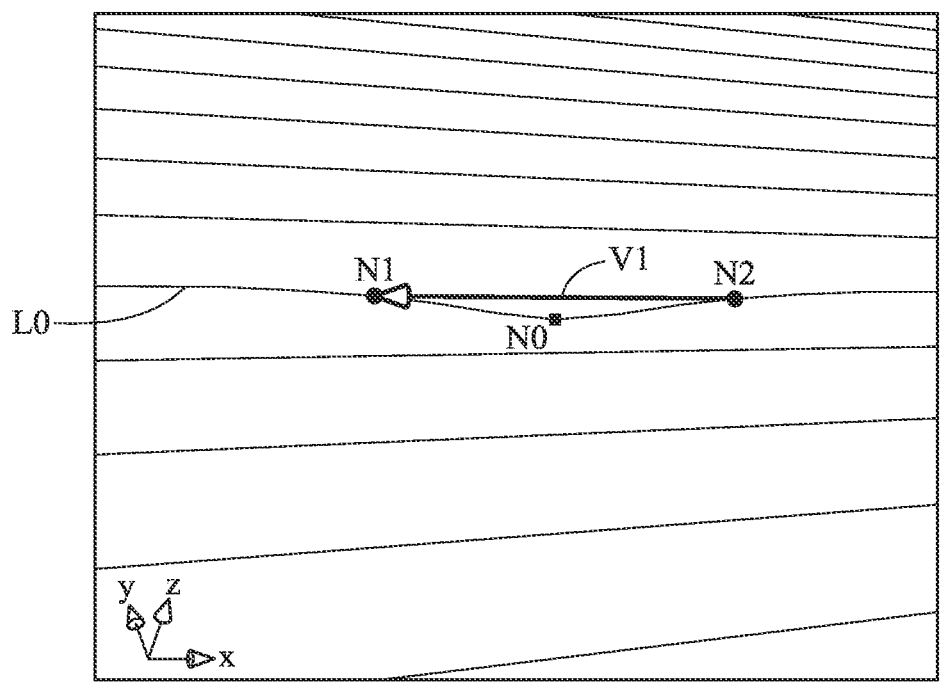
FIG. 6 is a schematic diagram of determining a path vector according to the two reference nodes shown in FIG. 5.

Please refer to FIGS. 1 and 6, step S14 is obtaining a path vector V1 according to the first reference node N1 and the second reference node N2. FIG. 6 is a schematic diagram of determining the path vector based on the two reference nodes shown in FIG. 5.

Figure 7:
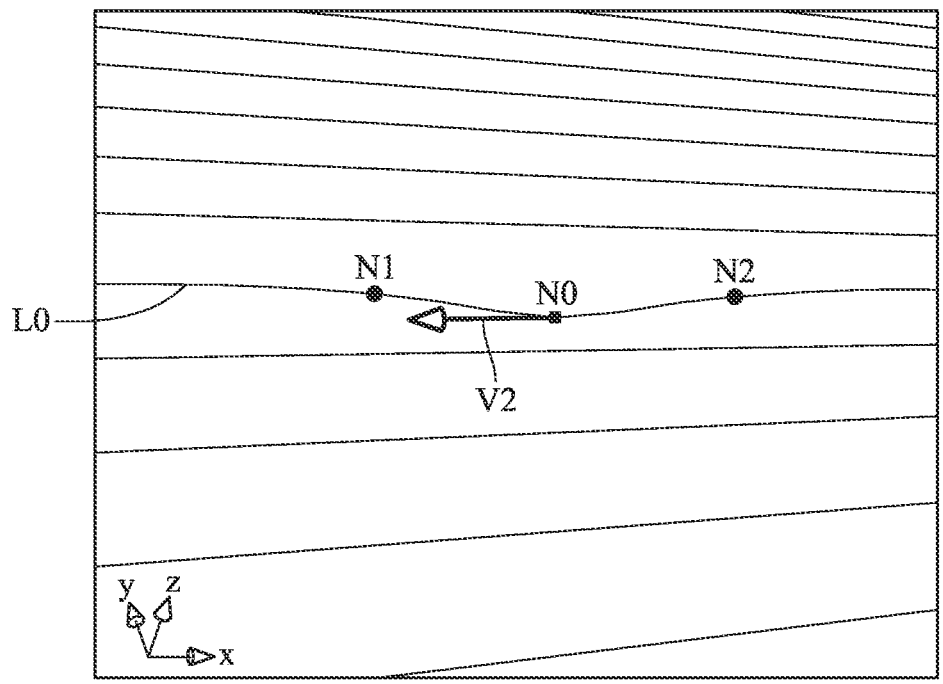
FIG. 7 is a schematic diagram of obtaining a tangent vector passing through the specified node according to the specified path and the specified node shown in FIG. 5.

Please refer to FIGS. 1 and 7, step S15 is obtaining a tangent vector V2 passing through the specified node N0 according to the specified machining path L0 and the specified node N0, wherein FIG. 7 is a schematic diagram of obtaining the tangent vector passing through the specified node according to the specified machining path and the specified node.

Figure 8:
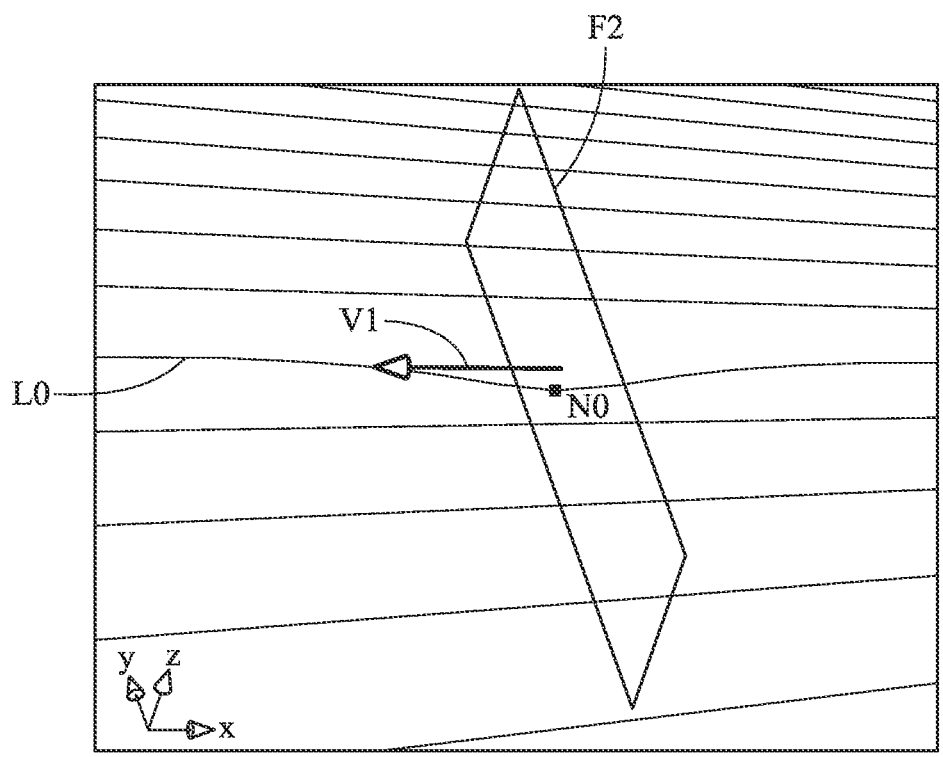
FIG. 8 is a schematic diagram of determining a sectional plane according to the path vector, the tangent vector and the specified node shown in FIGS. 6 and 7.

Please refer to FIGS. 1 and 8, step S16 is obtaining a sectional plane F2 passing through the specified node N0 according to the path vector V1, the tangent vector V2 and the specified node N0, wherein the path vector V1 is a normal vector of the sectional plane F2, and the tangent vector V2 and the sectional plane F2 are not coplanar, wherein FIG. 8 is a schematic diagram of determining the sectional plane based on the path vector, the tangent vector and specified nodes shown in FIGS. 6 and 7.

Figure 9:
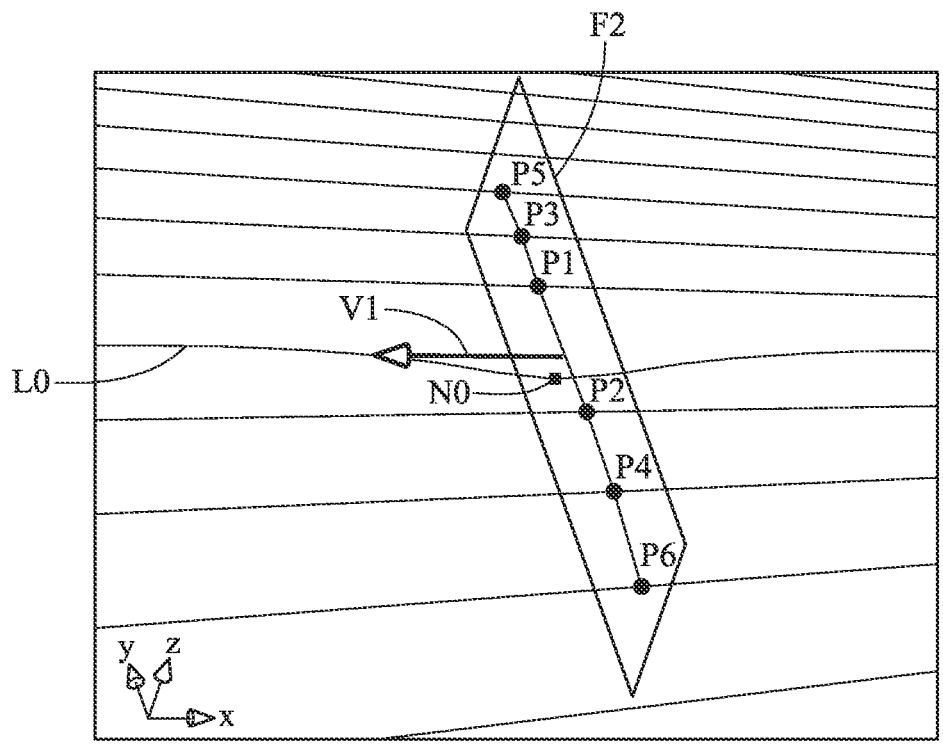
FIG. 9 is a schematic diagram of defining a plurality of intersection points according to the sectional plane shown in FIG. 8.

Please refer to FIGS. 1 and 9, step S17 is calculating multiple intersection points P1~P6 between the sectional plane F2 and the other machining paths which are different from the specified machining path L0. FIG. 9 is a schematic diagram of obtaining the intersection points according to the sectional plane shown in FIG. 8.

Figure 10:
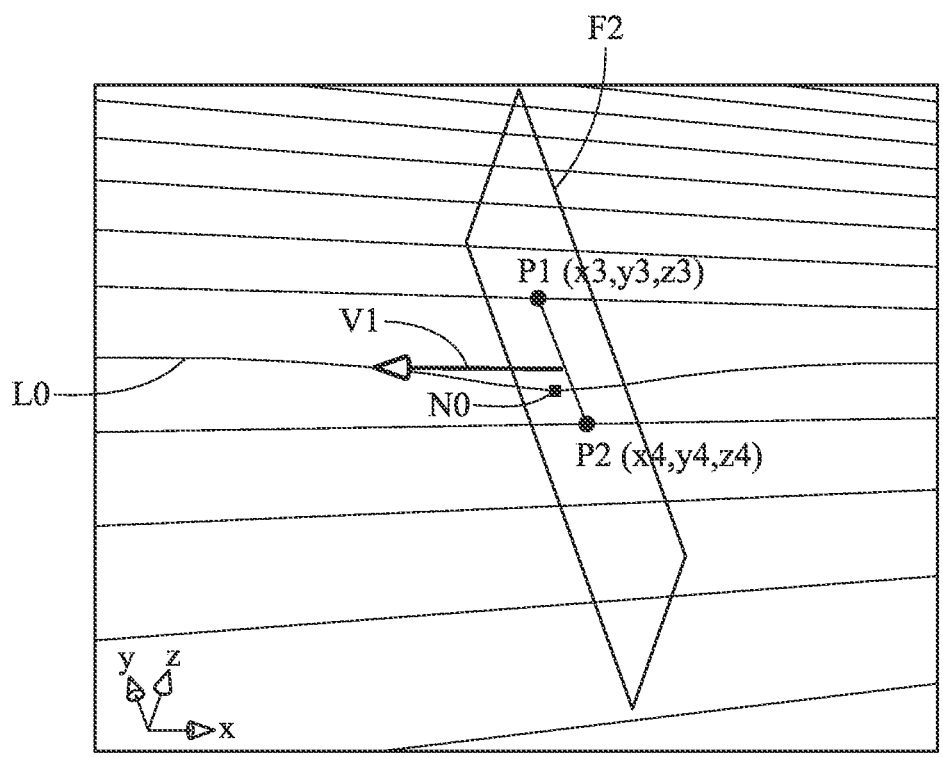
FIG. 10 is a schematic diagram of designating two of the intersection points as a first adjacent intersection point a second adjacent intersection point shown in FIG. 9.

Please refer to FIGS. 1 and 10, step S18 is selecting intersection points P1 and P2 from the intersection points P1 to P6 and defining the intersection points P1 and P2 as a first adjacent intersection point and a second adjacent intersection point, wherein FIG. 10 is a schematic diagram of defining the first adjacent intersection point and the second adjacent intersection point according to the intersection points shown in FIG. 9. In FIG. 10, the coordinate of the first adjacent intersection point is ($x_3$, $y_3$, $z_3$), and the coordinate of the second adjacent intersection point is ($x_4$, $y_4$, $z_4$). The first adjacent intersection point and the second adjacent intersection point are located on opposite sides of the specified node N0 along a second direction. The first direction is different from the second direction. For example, the first direction may be an X-axis direction and the second direction may be a Y-axis direction.

Figure 11:
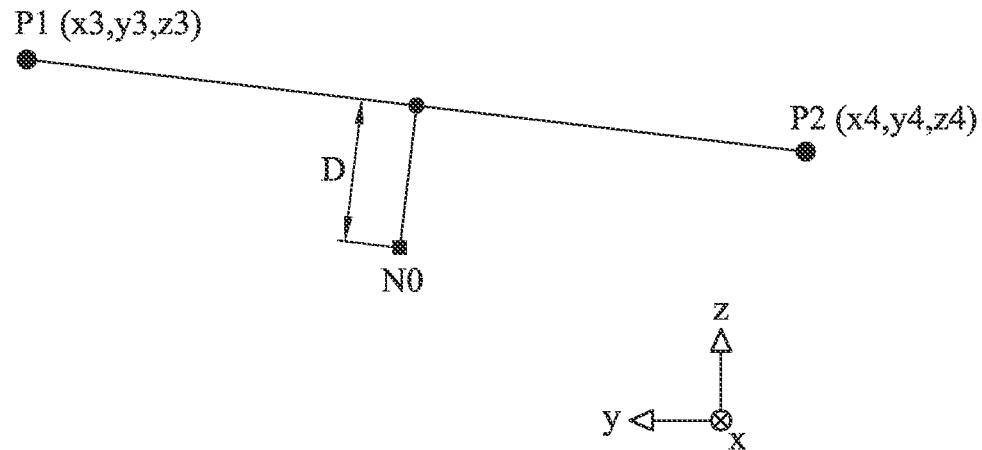
FIG. 11 is a schematic diagram of calculating an overcutting amount of the specified node.

Please refer to FIGS. 1 and 11. step S19 is obtaining a connection line located between the first adjacent intersection point and the second adjacent intersection point and calculating a distance D between the specific node N0 and the connection line along a third direction. For example, the third direction may be a Z axis direction. Moreover, the distance D is defined as an overcutting amount of the specified node N0, wherein FIG. 11 is a schematic diagram of calculating the overcutting amount of the specified node.

Finally, after obtaining the overcutting amount of the specific node N0, a part of the machining code which is related to the specific node N0 can be corrected according to the overcutting amount of the specific node N0, which can eliminate the overcutting defect of the specific node N0 on the cutting face F1.

Figure 12:
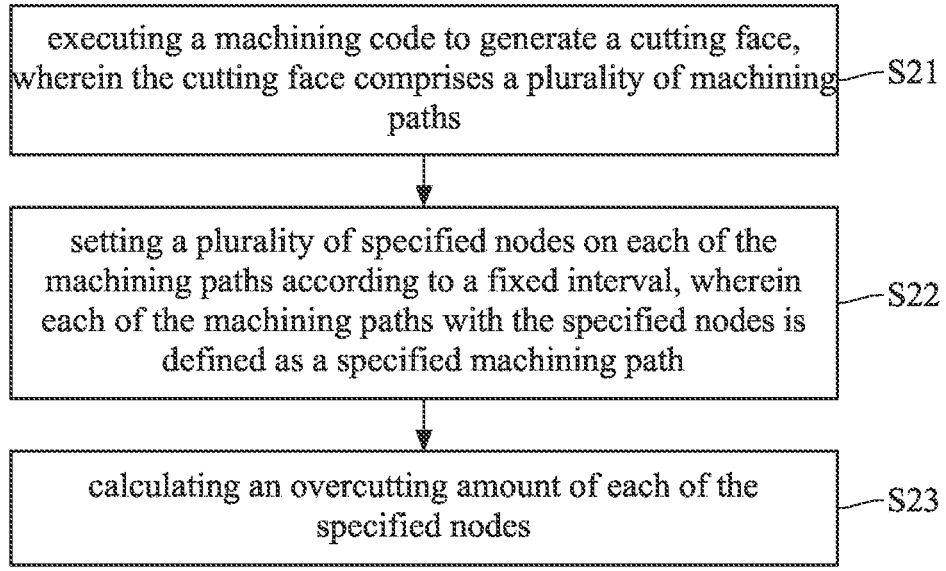
FIG. 12 is a flowchart of a method for analyzing an overcutting defect of a machining process according a second embodiment of this disclosure.

FIG. 12 is a flowchart of a method for analyzing an overcutting defect of a machining process according a second embodiment of this disclosure. Step S21 is executing a machining code to generate a cutting face, wherein the cutting face comprises a plurality of machining paths. Step S22 is setting a plurality of specified nodes on each of the machining paths according to a fixed interval, wherein each of the machining paths with the specified nodes is defined as a specified machining path. Step S23 is calculating an overcutting amount of each of the specified nodes, wherein the detailed sub-steps of step S23 comprise steps S231~S237.

Figure 13:
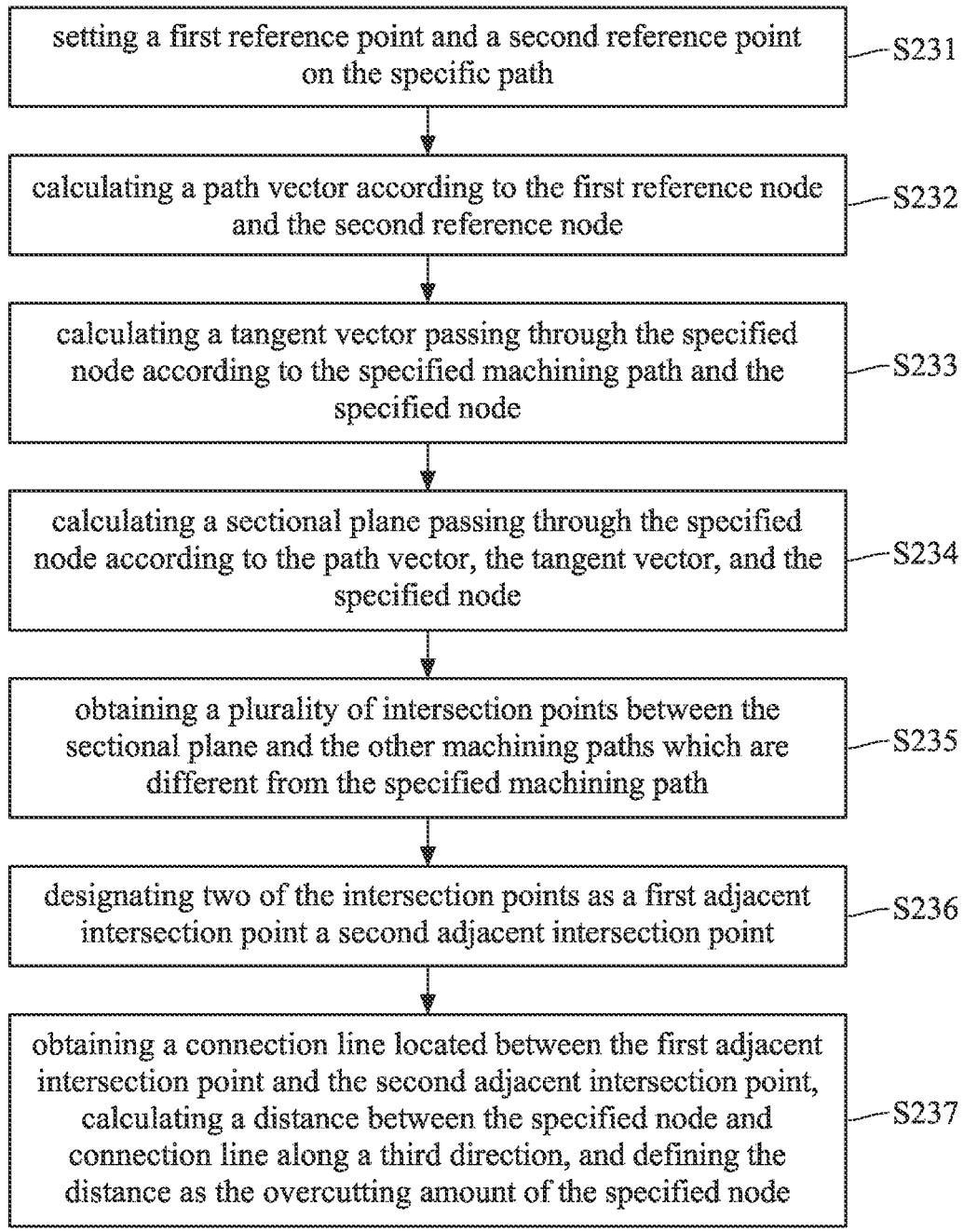
FIG. 13 is flowchart of calculating the overcutting amount of each of the specified nodes on the specified path shown in FIG. 12.

FIG. 13 is flowchart of calculating the overcutting amount of each of the specified nodes on the specified path shown in FIG. 12. Refer to FIGS. 12 and 13, step S231 is setting a first reference point and a second reference point on the specific path, wherein the first reference node and the second reference node are located on opposite sides of the specific node along the first direction. For example, the first direction may be the X-axis direction, and a first distance between the first reference node and the specific node and a second distance between the second reference node and the specific node may be the same or different. In other embodiments, the first reference node and the second reference node may be located on the same side of the specific node along the first direction, and the first distance between the first reference node and the specific node and second distance between the second reference node and the specific node are different. In the preferred embodiment, the first reference node and the second reference node are located on opposite sides of the specific node along the first direction (for example, the X-axis direction). Step S232 is calculating a path vector according to the first reference node and the second reference node. Step S233 is calculating a tangent vector passing through the specified node according to the specified machining path and the specified node. Step S234 is calculating a sectional plane passing through the specified node according to the path vector, the tangent vector, and the specified node, wherein the path vector is a normal vector of the sectional plane, and the tangent vector and the sectional plane are not coplanar. Step S235 is obtaining a plurality of intersection points between the sectional plane and the other machining paths which are different from the specified machining path. Step S236 is designating two of the intersection points as a first adjacent intersection point and a second adjacent intersection point, wherein the first adjacent intersection point and the second adjacent intersection point are located on opposite sides of the specified node along the second direction (for example, the second direction may be the Y-axis direction), and the second direction is different from the first direction (for example, the first direction may be the X-axis direction). Step S237 is obtaining a connection line located between the first adjacent intersection point and the second adjacent intersection point and calculating a distance between the specified node and connection line along a third direction (for example, the third direction may be a Z-axis direction), and the distance is defined as the overcutting amount of the specified node.

By the overcutting analysis method of the machining path in FIG. 12, it is possible to comprehensively inspect each of the nodes to determine whether each of the nodes has an overcutting defect on the cutting surface to improve the quality of the finished product without an actual location information feedback from the machine tool controller.

In view of the above description, the overcutting amount of the specified node may be estimated before the machining code is imported into a machine tool. Then a part of the machining code which is related to the specified node may be corrected according to the estimated overcutting amount to eliminate the overcutting defect of the specified node. In other words, the method of this disclosure may detect the overcutting amount of the specified node without an actual location information feedback from the machine tool controller, and directly modify the machining code to achieve a purpose of optimizing the machining path.

What is claimed is:

1. A method for analyzing an overcutting defect of a machining process, adapted to be executed by a machining path planning device, and the method comprising: executing a machining code to generate a cutting face, wherein the cutting face comprises a plurality of machining paths; selecting one of the plurality of machining paths as a specified machining path and setting a specified node on the specified machining path; calculating a path vector and a tangent vector passing through the specified node according to the specified machining path and the specified node; calculating a sectional plane passing through the specified node according to the path vector, the tangent vector, and the specified node, wherein the path vector is a normal vector of the sectional plane, and the tangent vector and the sectional plane are not coplanar; obtaining a plurality of intersection points between the sectional plane and the other machining paths which are different from the specified machining path; designating two of the intersection points as a first adjacent intersection point a second adjacent intersection point, wherein the first adjacent intersection point and the second adjacent intersection point are respectively located on opposite sides of the specified node; obtaining a connection line, wherein the connection line is a line connecting the first adjacent intersection point and the second adjacent intersection point; and calculating a distance between the specified node and the connection line and defining the distance as an overcutting amount of the specified node, wherein calculating the sectional plane passing through the specified node according to the path vector, the tangent vector, and the specified node comprises: setting a first reference node and a second reference node on the specified machining path; and obtaining the path vector according to the first reference node and the second reference node.

2. The method according to claim 1, wherein the first reference node and the second reference node are located on the same side of the specified node along a first direction, and a distance between the first reference node and the specified node is different from another distance between the second reference node and the specified node.

3. The method according to claim 1, wherein the first reference node and the second reference node are respectively located on opposite sides of the specified node along a first direction.

4. The method according to claim 3, wherein the first adjacent intersection point and the second adjacent intersection point are respectively located on opposite sides of the specified node along a second direction, and the second direction is different from the first direction.

5. A method for analyzing an overcutting defect of a machining process, adapted to be executed by a machining path planning device, and the method comprising: executing a machining code to generate a cutting face, wherein the cutting face comprises a plurality of machining paths; setting a plurality of specified nodes on each of the machining paths according to a fixed interval, wherein each of the machining paths with the specified nodes is defined as a specified machining path; and calculating an overcutting amount of each of the specified nodes, wherein calculating the overcutting amount of each of the specified nodes comprises: calculating a path vector and a tangent vector passing through the specified node according to the specified machining path and the specified node; calculating a sectional plane passing through the specified node according to the path vector, the tangent vector, and the specified node, wherein the path vector is a normal vector of the sectional plane, and the tangent vector and the sectional plane are not coplanar; obtaining a plurality of intersection points between the sectional plane and the other machining paths which are different from the specified machining path; designating two of the intersection points as a first adjacent intersection point a second adjacent intersection point, wherein the first adjacent intersection point and the second adjacent intersection point are respectively located on the opposite sides of the specified node; obtaining a connection line, wherein the connection line is a line connecting the first adjacent intersection point and the second adjacent intersection point; and calculating a distance between the specified node and the connection line and defining the distance as the overcutting amount of the specified node, wherein calculating the sectional plane passing through the specified node according to the path vector, the tangent vector, and the specified node comprises: setting a first reference node and a second reference node on the specified machining path; and obtaining the path vector according to the first reference node and the second reference node.

6. The method according to claim 5, wherein the first reference node and the second reference node are located on the same side of the specified node along a first direction, and a distance between the first reference node and the specified node is different from another distance between the second reference node and the specified node.

7. The method according to claim 5, wherein the first reference node and the second reference node are respectively located on opposite sides of the specified node along a first direction.

8. The method according to claim 7, wherein the first adjacent intersection point and the second adjacent intersection point are respectively located on the opposite sides of the specified node along a second direction, and the second direction is different from the first direction.

* * * * *